United States Patent
Singh et al.

(10) Patent No.: US 8,161,228 B2
(45) Date of Patent: Apr. 17, 2012

(54) APPARATUS AND METHOD FOR OPTIMIZED NAND FLASH MEMORY MANAGEMENT FOR DEVICES WITH LIMITED RESOURCES

(75) Inventors: Satpreet Singh, Plano, TX (US); Fan Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 12/383,077

(22) Filed: Mar. 19, 2009

(65) Prior Publication Data

US 2010/0241786 A1    Sep. 23, 2010

(51) Int. Cl.
*G06F 12/00*    (2006.01)
(52) U.S. Cl. .......................... 711/103; 711/104
(58) Field of Classification Search ............. 711/103, 711/104
See application file for complete search history.

(56) References Cited

U.S. PATENT DOCUMENTS

| | | | |
|---|---|---|---|
| 6,865,657 B1* | 3/2005 | Traversat et al. | 711/170 |
| 2005/0204187 A1* | 9/2005 | Lee et al. | 714/8 |
| 2008/0082736 A1* | 4/2008 | Chow et al. | 711/103 |
| 2009/0248959 A1* | 10/2009 | Tzeng | 711/103 |
| 2009/0327621 A1* | 12/2009 | Kliot et al. | 711/154 |
| 2010/0057976 A1* | 3/2010 | Lasser | 711/103 |

* cited by examiner

*Primary Examiner* — Hashem Farrokh

(57) ABSTRACT

An apparatus and method for managing memory in low-end electronic devices is provided. The apparatus includes a memory management unit. The memory management unit configured to allocate a portion of random access memory and a portion of flash memory as swap areas. The memory management unit performs swapping operations by swapping pages of content between the random access memory swap area and one or more blocks of the flash memory swap area. Thereafter, a page of content can be loaded from the flash memory swap area. The memory management unit also allocates a portion of flash memory as a garbage collection area. The memory management unit transfers dirty pages from the flash swap area to the garbage collection unit to free up flash memory swap area blocks.

20 Claims, 3 Drawing Sheets

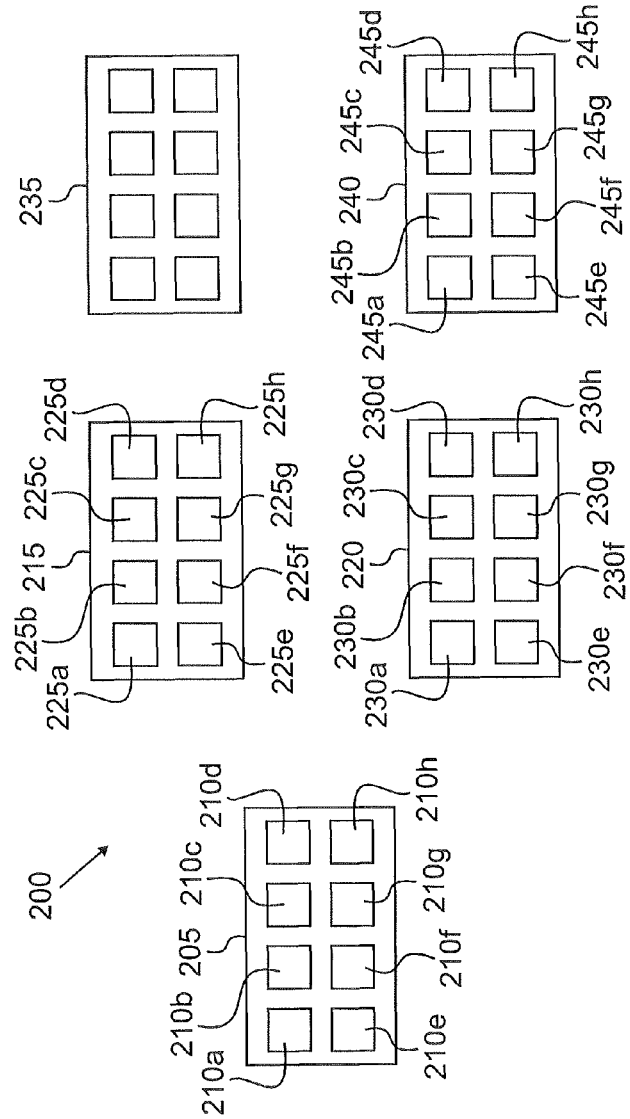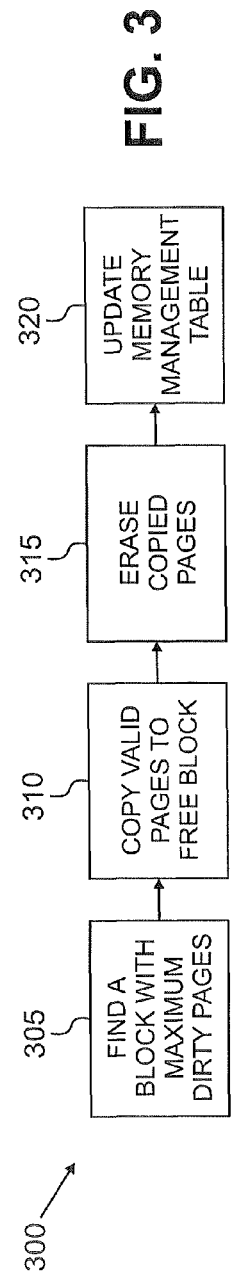

APPARATUS AND METHOD FOR OPTIMIZED NAND FLASH MEMORY MANAGEMENT FOR DEVICES WITH LIMITED RESOURCES

TECHNICAL FIELD OF THE INVENTION

The present application relates generally to computer systems and, more specifically, to flash memory management for computer systems.

BACKGROUND OF THE INVENTION

Flash memory is non-volatile computer memory that can be electrically erased and reprogrammed. Flash memory is primarily used in memory cards and USB flash drives for general storage and the transfer of data between computers and other digital products.

Flash memory is a specific type of Electrically Erasable Programmable Read-Only Memory ("EEPROM") that is erased and programmed in large blocks. In early flash memory devices, the entire chip had to be erased at once. Flash memory costs far less than a byte-programmable EEPROM. Therefore, flash memory has become the dominant technology wherever a significant amount of non-volatile, solid state storage is needed. Example applications include PDAs (personal digital assistants), laptop computers, digital audio players, digital cameras and mobile phones. Flash memory has also gained popularity in the game console market, where flash memory is often used instead of EEPROMs or battery-powered Static Random Access Memory ("SRAM") for game save data.

Flash memory is non-volatile, which means that no power is needed to maintain the information stored in the chip. In addition, flash memory offers fast read access times; although not as fast as volatile Dynamic Random Access Memory ("DRAM") used for main memory in PCs. Further, flash memory offers better kinetic shock resistance than hard disks. Another feature of flash memory is that when packaged in a "memory card," flash memory is enormously durable, being able to withstand intense pressure, extremes of temperature, and even immersion in water.

Although technically a type of EEPROM, the term "EEPROM" is generally used to refer specifically to non-flash EEPROM which is erasable in small blocks, typically bytes. Because erase cycles are slow, the large block sizes used in flash memory erasing give it a significant speed advantage over old-style EEPROM when writing large amounts of data.

NAND Flash architecture is one of two flash technologies (the other being NOR) used in memory cards such as the CompactFlash cards. NAND gate flash uses tunnel injection for writing and tunnel release for erasing. NAND flash memory forms the core of the removable USB storage devices known as USB flash drives and most memory card formats available today. It is also used in MP3 players, and provides the image storage for digital cameras. NAND is best suited to flash devices requiring high capacity data storage. NAND flash devices offer storage space up to 512-MB and offers faster erase, write, and read capabilities over NOR architecture.

One limitation of flash memory is that, although flash memory can be read or programmed a byte or a word at a time in a random access fashion, flash memory must be erased a "block" at a time. This generally sets all bits in the block to one (1). Starting with a freshly erased block, any location within that block can be programmed. However, once a bit has been set to zero (0), only by erasing the entire block can it be changed back to one (1). In other words, flash memory offers random-access read and programming operations, but cannot offer arbitrary random-access rewrite or erase operations. In general the entire block is erased and rewritten at once.

Conventional memory management systems for NAND flash devices are used for features like file system or demand loading for code. This makes it very difficult to implement memory management for demand loading for Read Wright (RW) and Zero Initialized data (ZI) with efficient usage of flash memory (hereinafter "flash" or "NAND flash") and Random-Access Memory (RAM). Conventional embedded systems do not consider swapping in memory management processes. In advanced systems, such as, but not limited to Linux®, static mapping between RAM and flash pages is used. When static mapping is used, the flash size must be the same as a size of the data from the swap area. Maintaining the flash size equal to the data from the swap area results in a reduction of the life cycle for NAND flash blocks.

SUMMARY OF THE INVENTION

An apparatus for managing memory in electronic devices is provided. The apparatus includes a memory management unit. The memory management unit configured to allocate a portion of random access memory and a portion of flash memory. The memory management unit performs swapping operations of pages of content between said random access memory and one or more blocks of said flash memory.

An electronic device is provided. The electronic device includes a processor, a random access memory, a flash memory, and a memory management unit. The memory management unit configured to allocate a portion of the random access memory and a portion of the flash memory. The memory management unit performs swapping operations of pages of content between the random access memory and one or more blocks of the flash memory.

A method for memory management is provided. The method includes allocating a portion of random access memory as a first swap area. The method also includes allocating a portion of flash memory as a second swap area. Further, the method includes swapping pages of content from the first swap area to the second swap area and loading a new page of content from the second swap area.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a memory swap operation according to embodiments of the present disclosure;

FIG. 3 illustrates a memory management swap process according to embodiments of the present disclosure.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged memory management system.

Embodiments of the present disclosure illustrate a memory management system for NAND flash devices for use in low-end devices, such as, but not limited to ARM7 and ARM9 based devices with limited memory. ARM7 and ARM9 based devices, such as, but not limited to, an ARM7 based cellular telephone, can include thirty-two Mega-byte (32 MB) of flash, 2 MB of RAM and a 100 MHz Central Processing Unit (CPU). The memory management system is configured to use the NAND flash device to store changeable data. The memory management system is configured to utilize a smaller sized flash to perform the same functions as a large (e.g., high-end) device. The memory management system is configured to use flash to offset the size of RAM.

Figure 1:
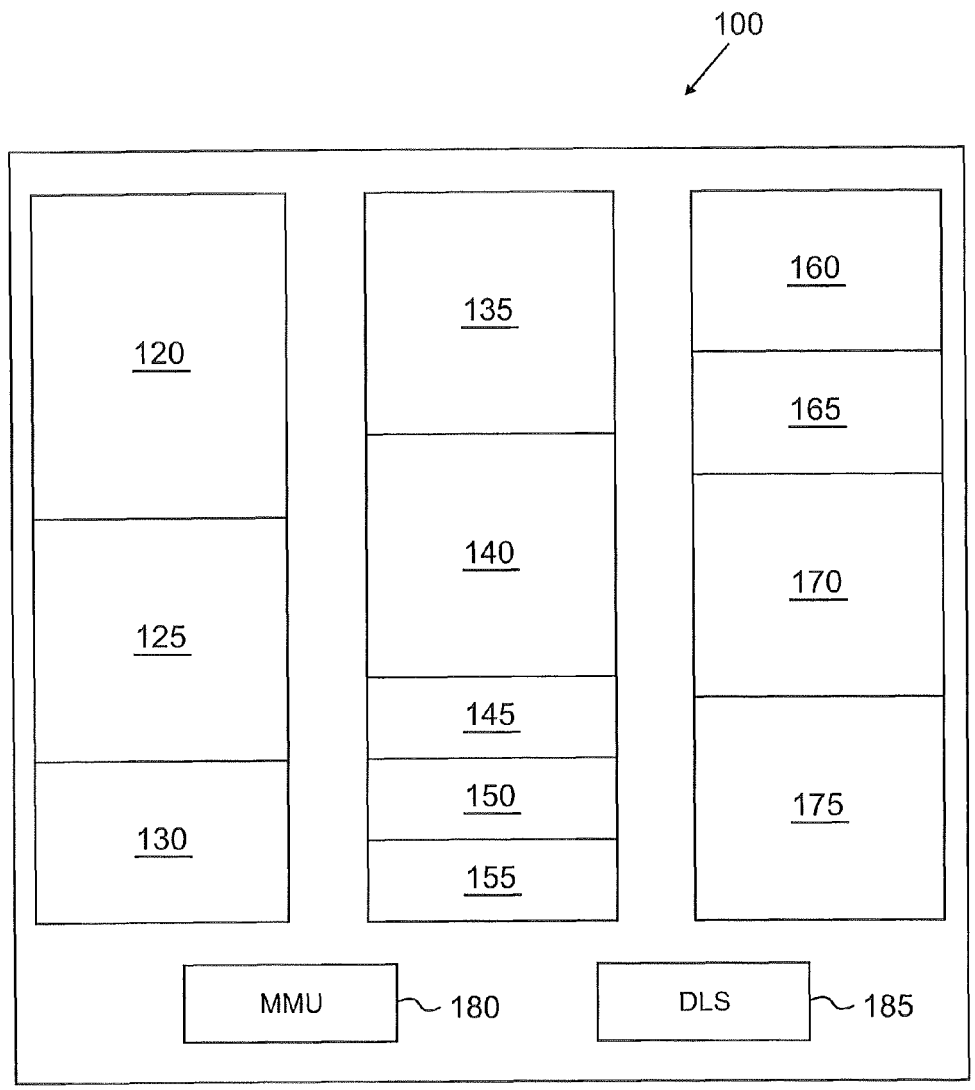
FIG. 1 illustrates a simple diagram for memory in a low-end device according to embodiments of the present disclosure.

FIG. 1 illustrates a simple diagram for memory in a low-end device according to embodiments of the present disclosure.

The embodiment of the memory in the low-end device shown in FIG. 1 is for illustration only. Other embodiments of the memory in the low-end device could be used without departing from the scope of this disclosure.

The memory for a low-end device 100 (hereinafter "device") includes a RAM 105, a flash 110 and a virtual memory 115.

It will be understood that although the RAM 105, flash 110 and memory 115 are illustrated together, the RAM 105, flash 110 and memory 115 could be located in different portions in the device 100. Further, one or more of the RAM 105, flash 110 and memory 115 could be located external to the device 100.

The RAM 105 includes a CODE/CONST execution area 120, a swap area 125 and a Heap 130. The flash 110 includes a CODE area 135, a RW init Data area 140, a flash swap area 145, a garbage collection area 150 and a file system area 155. The CODE area 135 includes instructions for the flash operation. The RW init data area 140 includes initialization data regarding what happens in the virtual memory 115. A partition manager (not shown) partitions the flash for RW and ZI demand load. The virtual memory 115 includes a CODE area 160, a CONST area 165, a RW area 170 and a ZI area 175. The virtual memory 115 can be much larger than RAM 105 and flash 110.

It will be understood that the relative sizes of the areas illustrated in FIG. 1 do not represent actual size relationships with respect to the areas. For example, the size of the flash swap area 145 actually may be larger than either the swap area 125 or the RW init Data area 140.

The virtual memory 115 is configured such that an application running on the device 100 sees the RW area 170 and the ZI area 175 as available memory. Accordingly, the swap area 125 from the RAM 105 is allocated for operation. Additionally, the flash swap area 145 is allocated for updating memory pages (e.g., saving state data). The size of the swap area 125 and the flash swap area 145 equals the size of the RW area 170 and the ZI area 175. For example, if the RW area 170 and ZI area 175 equals 4 MB, then the swap area 125 and the flash swap area 145 must equal at least 4 MB. Therefore, if the swap area 125 equals 1 MB, then the portion of flash (e.g., the flash swap area 145) must equal at least 3 MB.

The garbage collection area 150 is allocated for storage of "dirty page's". Dirty pages are pages of information existing in RAM 105. A Memory Management Unit (MMU) 180 of the device 100 is configured to perform garbage collection by removing dirty pages from flash swap area 145 and placing the dirty pages in garbage collection area 150. In some embodiments, the MMU 180 is configured to perform garbage collection during idle time. The MMU 180 performs garbage collection to "clean" flash swap area 145 to allow for ongoing or future swap operations.

The MMU 180 can be a special processor responsive to a plurality of instructions stored in a computer readable medium, e.g., a portion of memory, such as RAM 105. Additionally, MMU 180 can include the plurality of instructions stored in a computer readable medium within the MMU 180.

When a page fault occurs, the MMU 180 saves a swapped page from RAM 105 into flash before loading new content from the flash 110. For example, a data (e.g., a page) currently stored in swap area 125 is saved by the MMU 180 into the flash swap area 145.

The MMU 180 uses a block in the flash swap area 145 that has been least used to store this data. In some embodiments, the MMU 180 saves the data in the garbage collection area 150. The MMU 180 uses a block in the garbage collection area 150 that has been least used to store this data.

Further, the MMU 180 creates a database (not shown) for flash usage. The MMU 180 saves the database in flash 110.

When loading page content from flash 110 into RAM 105, the MMU 180 first checks if relevant content was referenced. If the content was not referenced, a Demand Load System (DLS) 185 initializes the data. If the content previously was referenced, the MMU 180 loads the content from a swapped page in the flash swap area 145.

FIG. 2 illustrates a memory swap operation according to embodiments of the present disclosure. The embodiment of the memory swap operation 200 shown in FIG. 2 is for illustration only. Other embodiments of the memory swap operation 200 could be used without departing from the scope of this disclosure.

Swap area 125 contains a plurality of blocks. FIG. 2 illustrates one swap area block 205 of the plurality blocks contained in the swap area 125. The swap area block 205 includes a number of sectors 210a-210h for storing a number of pages of content.

Flash swap area 145 also contains a plurality of blocks. FIG. 2 illustrates a first flash swap area block 215, a second flash swap area block 220 and a third flash swap area block 240. Each of the flash swap area blocks 215, 220 includes a number of sectors 225a-225h, 230a-230h, and 245a-245h respectively, for storing a number of pages of content.

In one example, sectors 210a-210d contain pages of content. Additionally, sectors 225a-225e contain pages of content. Further, sectors 230g and 230h and sectors 245a-245f also contain pages of content.

In some embodiments, an application is running on the device 100. The application requires a specified amount of memory.

The device 100 may provide the required memory space as virtual memory. For example, the application may require memory space for four (4) pages of content. In some such embodiments, the device allocates virtual memory from the RW area 170 and the ZI area 175.

The MMU 180 allocates sectors from flash 110 for use by the application. The MMU 180 determines that the first flash swap area block 215 only contains three (3) available sectors. Further, the MMU 180 determines that the second flash swap area block 220 contains six (6) available sectors. However, the MMU 180 further determines that allocating four (4) sectors from the second block 220 would result in three (3) free blocks in the first flash swap area block 215 and two (2) free blocks in the second flash swap area block 220. Therefore, the MMU 180 determines that a memory swap operation needs to be performed prior to allocation of sectors from flash 110.

Therefore, the MMU 180 copies the pages contained in sectors 230g and 230h. The MMU 180 then saves the copied pages in sectors 225f and 225g. After saving the pages in sectors 225f and 225g, the MMU 180 erases the pages from sectors 230g and 230h. The MMU 180 can erase the pages from sectors 230g and 230h by erasing the entire second flash swap area block 220. Then, the MMU 180 can allocate memory from the first flash swap area block 215 for use by the application.

In some embodiments, the pages in sectors 230g and 230h contain the same content as found in any of sectors 210a-210d, such as, for example, 210c and 210d. As such, the pages contained in sectors 230g and 230h are referred to as dirty pages.

In such embodiments, the MMU 180 determines that the pages saved in sectors 230g and 230h are dirty pages. The MMU 180 can copy the dirty pages from the second flash swap area block 220.

Then, the MMU 180 saves the copied dirty pages in a garbage collection area block 235. The garbage collection area block 235 can be one of a plurality of blocks contained in the garbage collection area 150. As such, illustration of one garbage area block 235 is for example purposes only. Further, one or more of the sectors included in the garbage collection area block 235 currently may contain pages of content. Thereafter, the MMU 180 erases the dirty pages from sectors 230g and 230h by erasing the entire second flash swap area block 220. Then, the MMU 180 can allocate memory from the second flash swap area block 220 for use by the application.

In some embodiments, the MMU 180 swaps one or more pages from swap area block 205 to one of the first flash swap area block 215 and the second flash swap area block 220. The MMU 180 identifies one or more blocks (e.g., the first flash swap area block 215 and the second flash swap area block 220) in flash swap area 145 that are least erased. Then, the MMU 180 saves the one or more pages, from swap area block 205, to the least erased blocks. Thereafter, the MMU 180 can allocate memory from RAM 105 for use by the application.

FIG. 3 illustrates a memory management swap process according to embodiments of the present disclosure. The embodiment of the memory management swap process 300 shown in FIG. 3 is for illustration only. Other embodiments of the memory management swap process 300 could be used without departing from the scope of this disclosure.

In step 305, the MMU 180 finds a block with a maximum number of dirty pages. The MMU 180 evaluates what blocks contain pages of content also located in RAM 105 (e.g., in swap area 125).

The MMU 180 selects a block with a maximum number of dirty pages in order to make available a maximum amount of space (e.g., sectors). The MMU 180 erases the dirty bits from the block with the maximum number of dirty pages. In some embodiments, the MMU 180 transfers the dirty pages to the garbage collection area 150. In such embodiments, the MMU 180 saves a copy of the dirty pages to the garbage collection area 150 prior to erasing the dirty bits from the block with the maximum number of dirty pages.

For example, the MMU 180 may determine that all of the pages located in blocks 225a-225e are dirty (e.g., a copy of the content within those pages also resides in RAM 105). The MMU 180 may also determine that the pages located in blocks 230g-230h are dirty. Further, the MMU 180 may determine that one or more of the pages located in sectors 245a-245c previously have been swapped.

The MMU 180 selects the pages located in the first flash swap area block 215 as the pages to be erased. The MMU 180 selects the first flash swap area block 215 because erasure of the dirty pages located in the first flash swap area block 215 results in a freeing-up of the maximum amount of memory space. The MMU 180 does not select the second flash swap area block 220 because only two (2) blocks would be erased as opposed to the five (5) erased from the first flash swap area block 215. The MMU 180 also does not select the third flash swap area block 240 because one or more of the blocks previously have been swapped.

In step 310, the MMU 180 copies the valid pages from RAM 105 to flash 110. The MMU 180 copies one or more pages from the swap area block 205. The MMU 180 then saves the copied pages to one of the first flash swap area block 215. In some embodiments, the MMU 180 selects either the second flash swap area block 220 or the third flash swap area block 240 based on the number of pages copied from the swap area block 205.

Then, in step 315, the MMU 180 erases the pages copied from the swap area block 205. Thereafter, the MMU 180 updates a memory management table (not shown) in step 320.

Figure 4:
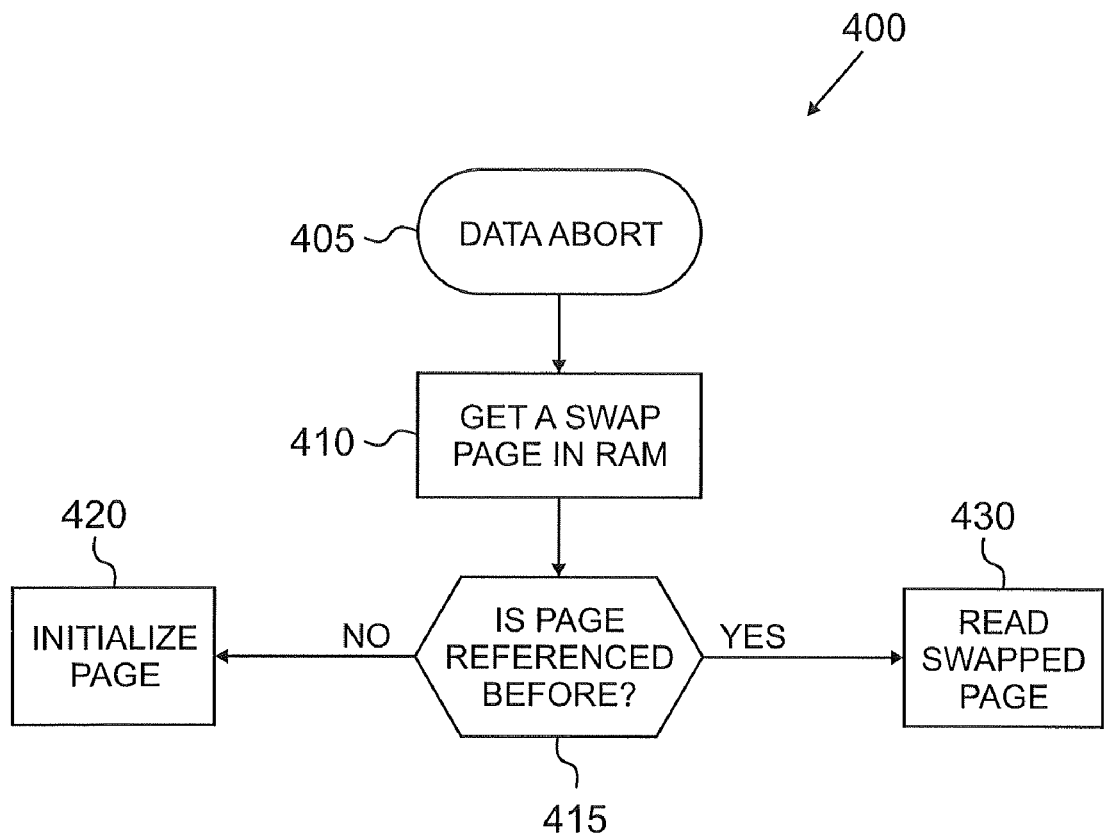
FIG. 4 illustrate a page fault process according to embodiments of the present disclosure.

FIG. 4 illustrate a page fault process according to embodiments of the present disclosure. The embodiment of the page fault process 400 shown in FIG. 4 is for illustration only. Other embodiments of the page fault process 400 could be used without departing from the scope of this disclosure.

A data abort occurs in step 405. When a page fault (e.g., data abort) occurs, the MMU 180 saves a swapped page from RAM 105 into flash before loading new content from the flash 110. For example, a data (e.g., a page) currently stored in swap area 125 is saved by the MMU 180 into the flash swap area 145. The MMU 180 uses a block in the flash swap area 145 that has been least used to store this data. In some embodiments, the MMU 180 saves the data in the garbage collection area 150. The MMU 180 uses a block in the garbage collection area 150 that has been least used to store this data.

In step 410, the MMU 180 obtains a swap page in RAM 105.

When loading page content from flash 110 into RAM 105, the MMU 180 first checks if relevant content was referenced in step 415. If the content was not referenced in step 415, the DLS 185 initializes the data in step 420. If the content previously was referenced, as identified in step 415, the MMU 180 loads the content from a swapped page in the flash swap area 145 in step 430.

The MMU 180 further is configured to perform garbage cleanup operations during idle times (e.g., periods of time wherein the application does not require use of memory and/ or when the MMU 180 is not required to perform swap or page fault operations). The MMU 180, periodically or during idle times, scans the plurality of blocks located in the flash swap area 145. The MMU 180 identifies blocks containing dirty pages. The MMU 180 performs swapping operations (discussed in further detail with respect to FIG. 2).

The MMU 180 relocates content (e.g., pages of content) from one of the flash swap area blocks to another of the flash swap area blocks if necessary. After moving the content, the MMU 180 erases flash swap area blocks containing only dirty pages. In some embodiments, the MMU 180 copies the dirty pages to the garbage collection area 150 prior to erasing the dirty pages.

Accordingly, the device 100 is configured to store most data flash 110 as opposed to RAM 105. The MMU 180 can be configured to optimize memory management using an allocation of RAM and NAND flash, as discussed herein. The MMU 180 can be incorporated into any device 100 with limited RAM and limited flash, such as, but not limited to, cellular telephones, MP3 players, televisions, personal data assistants, navigation devices (such as global positioning system (GPS) devices), digital recorders, and ARM7 and ARM9 devices.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for managing memory in electronic devices, the apparatus comprising:
   a memory management unit configured to allocate a portion of random access memory and a portion of flash memory, wherein said memory management unit allocates a portion of flash memory as a garbage collection area; and performs swapping operations of pages of content between said random access memory and one or more blocks of said flash memory, wherein said memory management unit transfers dirty pages to said garbage collection area.

2. The apparatus as set forth in claim 1, wherein said memory management unit identifies a first block in said flash memory, wherein said first block contains a maximum number of dirty pages as compared to a second block in said flash memory.

3. The apparatus as set forth in claim 2, wherein said memory management unit is configured to store data copied from said random access memory into said first block during said swapping operations.

4. The apparatus as set forth in claim 2, wherein said memory management unit is configured to erase copied pages of content after said swapping operation; and
   update a memory management table.

5. The apparatus as set forth in claim 1, wherein said memory management unit is further configured to determine, in response to a page fault, whether a page in said page fault has been referenced.

6. The apparatus as set forth in claim 1, wherein, in performing swapping, said memory management unit is further configured to swap pages in response to identifying a page fault occurring.

7. The apparatus as set forth in claim 1, wherein the flash memory is a NAND flash memory.

8. An electronic device, said electronic device comprising:
   a processor;
   a random access memory;
   a flash memory; and
   a memory management unit, said memory management unit configured to allocate a portion of said random access memory and a portion of said flash memory, wherein said memory management unit allocates a portion of said flash memory as a garbage collection area; and performs swapping operations of pages of content between said random access memory and one or more blocks of said flash memory, wherein said memory management unit transfers dirty pages to said garbage collection area.

9. The electronic device as set forth in claim 8, wherein said memory management unit identifies a first block in said flash memory, wherein said first block contains a maximum number of dirty pages as compared to a second block in said flash memory.

10. The electronic device as set forth in claim 9, wherein said memory management unit is configured to store data copied from said random access memory into said first block during said swapping operations.

11. The electronic device as set forth in claim 9, wherein said memory management unit is configured to erase copied pages of content after said swapping operation; and
    update a memory management table.

12. The electronic device as set forth in claim 8, wherein said memory management unit is
    further configured to determine, in response to a page fault, whether a page in said page fault has been referenced.

13. The electronic device as set forth in claim 8, wherein, in performing swapping, said memory management unit is further configured to swap the pages in response to identifying a page fault occurring.

14. The electronic device as set forth in claim 8, wherein the flash memory is a NAND flash memory.

15. For use in an electronic device, a method of memory management, the method comprising:
    allocating a portion of random access memory as a first swap area;
    allocating a portion of flash memory as a second swap area, wherein allocating further comprises allocating a portion of the flash memory as a garbage collection area;
    swapping pages of content from the first swap area to the second swap area, wherein swapping further comprises transferring dirty pages to the garbage collection area; and
    loading a new page of content from the second swap area.

16. The method as set forth in claim 15, wherein swapping further comprises:
    identifying a first block in the second swap area containing a maximum number of dirty pages as compared to a second block in the second swap area; and
    storing data copied from the first swap area into the first block during said swapping operations.

17. The method as set forth in claim 15, further comprising:
    erasing copied pages of content after swapping pages of content; and
    updating a memory management table.

18. The method as set forth in claim 15, further comprising:
    determining, in response to a page fault, whether a page in said page fault has been referenced.

19. The method as set forth in claim 15, wherein swapping comprises:
    swapping the pages in response to identifying a page fault occurring.

20. The method as set forth in claim 15, wherein the flash memory is a NAND flash memory.

* * * * *